(12) United States Patent
Richardson (10) Patent No.: US 7,901,547 B2
(45) Date of Patent: Mar. 8, 2011

(54) ELECTRICAL DEVICE FOR IMPEDING CORROSION

(75) Inventor: Robin Richardson, Bundaberg (AU)

(73) Assignee: Couplertec Pty Ltd, Queensland (AU)

( * ) Notice: Subject to any disclaimer, the term of this patent is extended or adjusted under 35 U.S.C. 154(b) by 342 days.

(21) Appl. No.: 12/295,271

(22) PCT Filed: Mar. 27, 2007

(86) PCT No.: PCT/AU2007/000382
§ 371 (c)(1),
(2), (4) Date: Sep. 29, 2008

(87) PCT Pub. No.: WO2007/115354
PCT Pub. Date: Oct. 18, 2007

(65) Prior Publication Data
US 2009/0166219 A1 Jul. 2, 2009

(30) Foreign Application Priority Data
Apr. 12, 2006 (AU) .............................. 2006901925

(51) Int. Cl.
*C25F 7/00* (2006.01)
*C23F 13/22* (2006.01)

(52) U.S. Cl. ............... 204/230.5; 204/230.8; 204/230.2; 204/228.1; 204/196.02; 204/196.03; 205/724; 205/725; 205/726; 205/727; 323/222; 323/232

(58) Field of Classification Search ............ 204/196.02, 204/196.03, 228.1, 230.2, 230.5, 230.8; 205/724, 205/725, 726, 727; 323/222, 232
See application file for complete search history.

(56) References Cited

U.S. PATENT DOCUMENTS

| | | | |
|---|---|---|---|
| 4,528,460 A | 7/1985 | Staerzl | |
| 4,664,764 A * | 5/1987 | Zofan | 205/726 |
| 4,767,512 A | 8/1988 | Cowatch | |
| 4,780,189 A | 10/1988 | Ridgley | |
| 5,077,486 A * | 12/1991 | Marson et al. | 205/728 |
| 6,046,515 A * | 4/2000 | Lewis | 307/95 |
| 6,224,742 B1 | 5/2001 | Doniguian | |
| RE38,581 E | 9/2001 | Doniguian | |
| 6,331,243 B1 * | 12/2001 | Lewis | 205/727 |
| 6,469,918 B1 * | 10/2002 | Abramski | 363/45 |
| 6,744,265 B2 | 6/2004 | Yunovich | |
| 6,875,336 B2 * | 4/2005 | Lewis et al. | 205/724 |
| 7,198,706 B2 * | 4/2007 | Lewis | 205/725 |
| 7,759,912 B2 * | 7/2010 | Weng et al. | 323/222 |
| 2002/0088720 A1 * | 7/2002 | Lewis et al. | 205/725 |
| 2004/0211677 A1 * | 10/2004 | Lewis | 205/725 |
| 2009/0284235 A1 * | 11/2009 | Weng et al. | 323/222 |

* cited by examiner

*Primary Examiner* — Bruce F Bell
(74) *Attorney, Agent, or Firm* — DeLio & Peterson, LLC; Anthony P. DeLio (57) ABSTRACT

The present invention relates to an electrical device for impeding corrosion of a metal body. The electrical device includes a driver circuit including at least one inductive component. The driver circuit is suitable for driving one or more pads coupled to the metal body so that corrosion of the metal body is impeded. A control circuit is provided for controlling the operation of the driver circuit. A feedback circuit provides feedback from the driver circuit to the control circuit. The driver circuit can operate as a resonant circuit, owing to the at least one inductive component, and ballast energy applied to the pads.

22 Claims, 5 Drawing Sheets

ELECTRICAL DEVICE FOR IMPEDING CORROSION

TECHNICAL FIELD

The present invention relates to an electrical device for impeding corrosion of a metal body. The present invention has particular, although not exclusive application to impeding the corrosion of motor vehicles.

The present invention also relates to a method for impeding corrosion of a metal body using an electrical device.

BACKGROUND

The reference to any prior art in this specification is not, and should not be taken as an acknowledgement or any form of suggestion that the prior art forms part of the common general knowledge.

Electrical devices for impeding corrosion of metal bodies such as motor vehicles are known. U.S. Pat. No. 4,767,512 and AU 766367 disclose such devices, and each device includes a signal generator control circuit which controls a driver circuit that drives pads which, in turn, are coupled to the vehicle. The electrical devices are configured to provide electrical signals to the pads so that corrosion of the vehicle is impeded.

The Applicant has discovered that in practice, such known devices are mounted to the vehicle and whilst it is assumed that they are operating effectively, there is no way of knowing whether this is in fact the case. Furthermore, the electrical signal driving the pads is often suboptimal, particularly in the event of one or more of the pads becoming dislodged from the vehicle.

It is an object of the present invention to provide an improved electrical device for impeding corrosion of metal bodies.

SUMMARY OF THE INVENTION

According to one aspect of the present invention, there is provided an electrical device for impeding corrosion of a metal body, the electrical device including:
  a driver circuit including at least one inductive component and for driving one or more pads coupled to the metal body so that corrosion of the metal body is impeded;
  a control circuit for controlling the operation of the driver circuit; and
  a feedback circuit for providing feedback from the driver circuit to the control circuit.

The driver circuit can operate as a resonant circuit, owing to the at least one inductive component, and ballast energy applied to the pads. The control circuit can optimise the performance of the resonant driver circuit (and therefore the output signal to the pads) using feedback from the feedback circuit.

The at least one inductive component may include a transformer. The at least one inductive component may include an inductor. The at least one inductive component may include a transformer, and one or more inductors.

The driver circuit may include:
  an LC circuit for coupling to the pads and including at least one of said at least one inductive component;
  a transformer circuit for driving the LC circuit and being another one of said at least one inductive component; and
  a switching circuit coupled to the control circuit and for driving the transformer circuit.

The control circuit may include a microcontroller, microprocessor or other like computational device. The control circuit may include a PIC 12F683 processor. In use, the control circuit can perform diagnostics of the electrical device using feedback from the feedback circuit.

Preferably, the control circuit includes a signal generator.

The feedback circuit may include a voltage feedback circuit for providing a signal relating to the voltage of the transformer to the control circuit. The feedback circuit may include a current feedback circuit for providing a signal relating to the core current of the transformer to the control circuit. The control circuit may further monitor a power supply voltage.

The electrical device may further include a display circuit for displaying information relating to the operation of the electrical device. The display information may be indicative of any one or more of the following group: a low power supply condition, an open circuit pad condition, excessive leakage current or short circuiting of a pad, and the status of the driver circuit.

The electrical device may further include a power supply circuit for providing regulated power to the control circuit.

The electrical device may further include the pads.

In use, the electrical device may be configured to generate an AC voltage signal between each pad and ground. The AC voltage signal may have a maximum voltage $V_{max}$ and a minimum voltage $V_{min}$ which is in excess of one quarter of $V_{max}$. In one embodiment, $V_{max}$ is about 400V.

According to a further aspect of the present invention, there is provided a method for impeding corrosion of a metal body using an electrical device, the method including the steps of:
  driving one or more pads coupled to the metal body with a driver circuit including at least one inductive component so that corrosion of the metal body is impeded;
  providing feedback from the driver circuit to a control circuit; and
  controlling, with the control circuit, the operation of the driver circuit using the provided feedback.

The step of driving may involve driving each pad with an AC voltage signal between the pad and ground. The AC voltage signal may have a maximum voltage $V_{max}$ and a minimum voltage $V_{min}$ which is in excess of one quarter of $V_{max}$. In one embodiment, $V_{max}$ is about 400V.

The step of providing may include providing feedback in the form of any one or more of the following group: a signal relating to the output voltage of a transformer of the driver circuit, and a signal relating to the core current of the transformer.

The method may further include the step of providing a power supply voltage measurement to the control circuit.

The method may further involve diagnosing a fault condition of the electrical device. The method may further involve displaying the diagnosed fault condition on a display. The fault condition may relate to any one or more of the following faults: a low power supply condition, an open circuit pad condition, excessive leakage current or short circuiting of a pad, and the status of a transformer of the driver circuit.

The step of controlling may include adjusting the amplitude of the AC voltage signal. The step of adjusting may include the step of adjusting the duty cycle of a signal from the controller to the driver circuit.

According to one aspect of the present invention, there is provided a kit for impeding corrosion of a motor vehicle, the kit including:
  the electrical device; and
  the one or more pads.

According to one aspect of the present invention, there is provided an electrical device for impeding corrosion of a metal body, the electrical device including:

one or more pads for coupling to the metal body;

a driver circuit for driving the one or more pads so that corrosion of the metal body is impeded;

a control circuit including at least one inductive component and for controlling the operation of the driver circuit; and a feedback circuit for providing feedback from the driver circuit to the control circuit.

According to a further aspect of the present invention, there is provided a method for impeding corrosion of a metal body using an electrical device, the method including the steps of:

driving one or more pads coupled to the metal body with a driver circuit including at least one inductive component so that corrosion of the metal body is impeded;

providing feedback from the driver circuit to a control circuit; and determining, with the control circuit, characteristics relating to the operation of the driver circuit using the provided feedback.

The method may further involve the step of optimising an output signal of the driver circuit using the determined characteristics. The power of the output signal may be optimised in accordance with the number of pads coupled to the metal body.

The method may further involve the step of performing diagnostics of the driver circuit and/or electrical device using the determined characteristics.

According to a further aspect of the present invention, there is provided one or more processors which are loaded with computer readable instructions to perform any one or more of the preceding methods.

According to a further aspect of the present invention, there is provided a media, such as a magnetic or optical disk or solid state memory, containing computer readable instructions for execution by one or more processors to thereby perform any one or more of the preceding methods.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 3b is a second example of a typical pad voltage measurement having a different pad configuration to that of FIG. 3a.

DETAILED DESCRIPTION OF PREFERRED EMBODIMENTS

Figure 1:
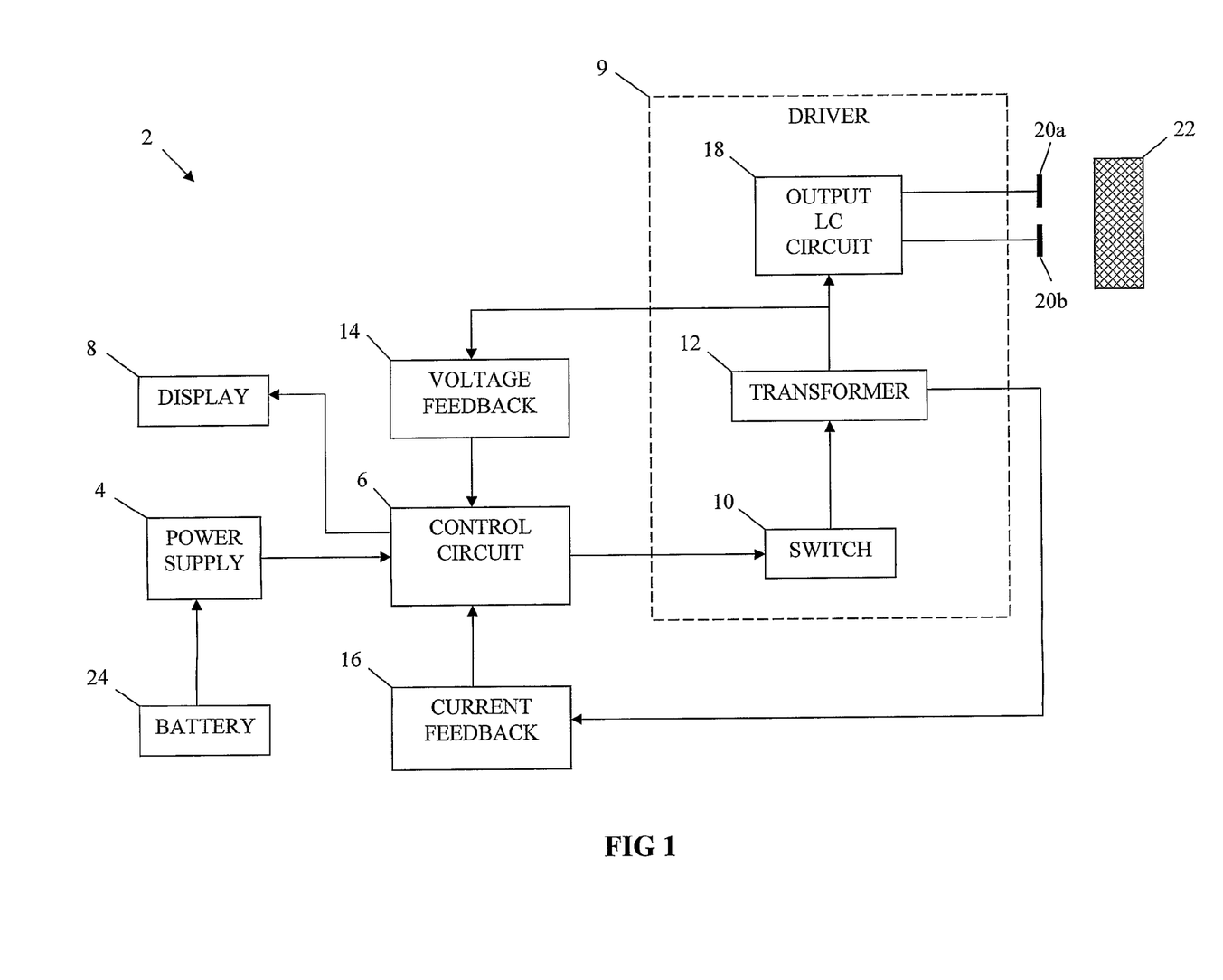
FIG. 1 is a functional block diagram of a electrical device for impeding corrosion of a metal body according to an embodiment of the present invention.
Figure 2:
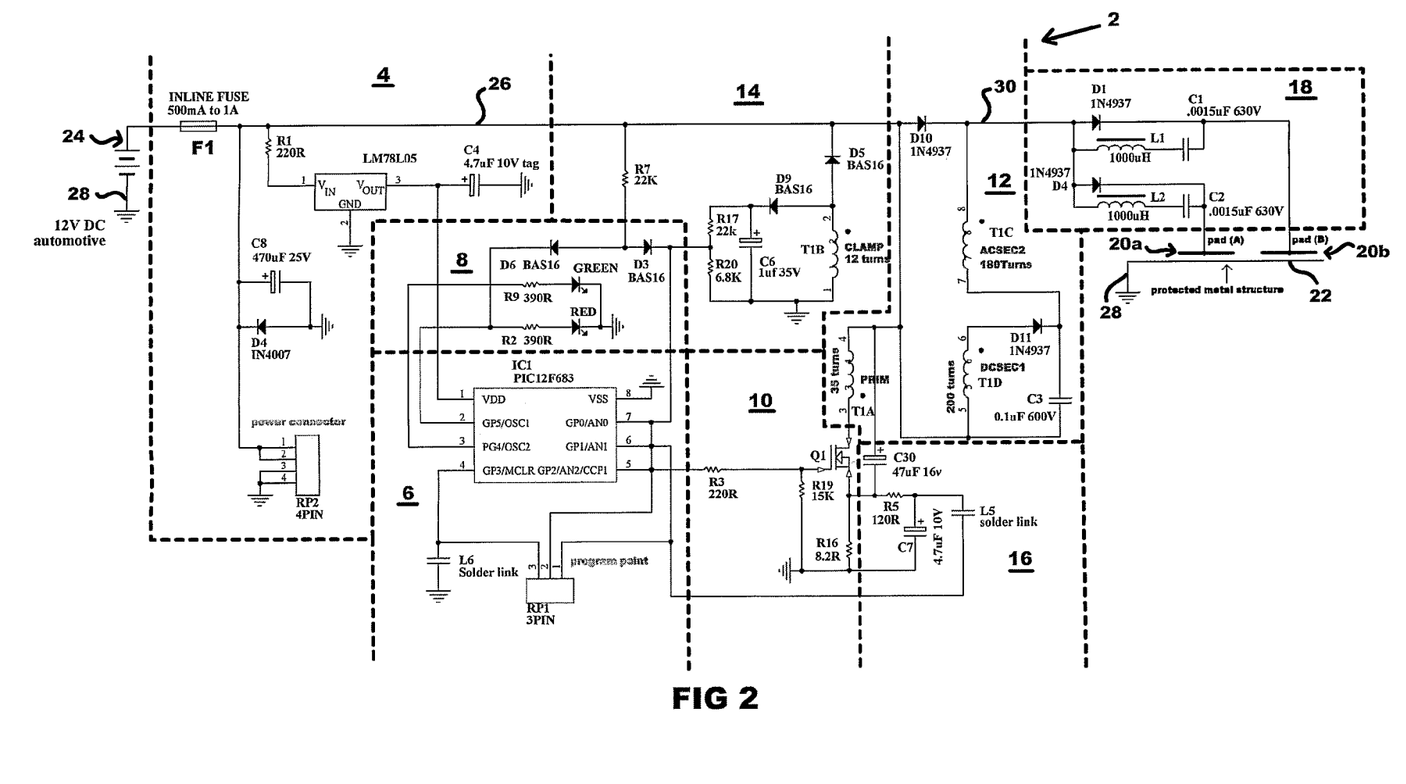
FIG. 2 is a schematic circuit diagram of the electrical device of FIG. 1.

According to a first embodiment of the present invention, there is provided an electrical device 2 for impeding corrosion of a metal body 22 as shown in FIGS. 1 and 2. In particular, the metal body 22 is the chassis or a motor vehicle to which the electrical device 2 is mounted.

Turning firstly to FIG. 1, the electrical device 2 includes a driver circuit 9 for driving a pair of pads 20a, 20b coupled to the metal body 22 so that corrosion of the metal body 2 is impeded. A control circuit 6 is provided for controlling the operation of the driver circuit 9. The driver circuit 9 includes an output LC circuit 18 for coupling to the pads 20, a transformer circuit 12 for driving the output LC circuit 18, and a switching circuit 10 coupled to the control circuit 6 and for driving the transformer circuit 12. The electrical device 2 further includes a feedback circuit, in the form of a voltage feedback circuit 14 and a current feedback circuit 16, which each provide feedback from the driver circuit 9 to the control circuit 6. The feedback circuit can be used to enable the control circuit 6 to more effectively control the driver circuit 9, and therefore the signal output of the pads 20.

The electrical device 2 further includes a display circuit 8 for displaying information relating to the operation of the electrical device 2. A power supply circuit 4 is also provided to supply regulated power to the control circuit 6 from a battery 24 power source.

The electrical device 2 is described in detail below with particular reference to FIG. 2.

Power Supply Circuit 4

The electrical device 2 includes a power supply circuit 4 for providing regulated power to the control circuit 6. The power supply circuit 4 includes a voltage regulator U1 which together with resistor R1 and capacitor C4 provide a regulated voltage supply input $V_{DD}$ for microprocessor IC1 of control circuit 6. The input $V_{IN}$ of voltage regulator U1 is coupled to the 12V vehicle battery 24 via R1 and an inline fuse F1.

The battery 24 is coupled to a main supply line 26 of the electrical device 2 which is filtered by C8. Diode D4 is provided in parallel to C8 and provides reverse polarity protection in conjunction with inline fuse F1 should the battery 24 be inadvertently connected in reverse.

Fuse F1 together with D10 of the transformer circuit 12, and D1 and D4 of output LC circuit 18, provide output short circuit protection in the event that the pads 20a, 20b are inadvertently shorted to ground 28.

The microprocessor IC1 can monitor the main supply line 26 through analog-to-digital input AN0 using a voltage divider which includes R7 and R20.

Control Circuit 6

The control circuit 6 includes microprocessor IC1 in the form of a PIC 12F683 processor which is a low power nano-Watt device. Microprocessor IC1 features a 4 channel 10 bit A/D converter, 8 MHz inbuilt clock, Analogue comparators, and a pulse width modulation (PWM) signal generator. Advantageously, all clocking requirements are internal to microprocessor IC1. The inclusion of microprocessor IC1 also offers control reliability and flexibility which is superior to known analogue control and signal generation alternatives, thereby resulting in superior output waveforms to the pads 20.

Display Circuit 8

The electrical device 2 further includes a display circuit 8 for displaying information relating to the operation of the electrical device 2. The display circuit includes a red light emitting diode (LED) D2 and a green LED D8. The display information may be indicative of anyone or more of the following group of faults: a low power supply condition of battery 24, an open circuit pad condition of a pad 20, excessive leakage current of a pad 20, and the status of the transformer T1. The microprocessor IC1 can independently drive LEDs D2 and D8, using output PG5 and output PG4 respectively, so as to produce a variety of combinations which each reflect a respective fault. The LEDs D2 and D8 can also be intermittently pulsed for this purpose.

Switching Circuit 10

In use, microprocessor IC1 provides a signal generator for providing a PWM signal at output CCP1 which drives field effect transistor (FET) Q1. The waveform at the base of FET Q1 is typically about 19-20 KHz and has a variable duty cycle which can be adjusted to ultimately vary the output voltage at the pads 20. The switching circuit 10 can be used in conjunction with the inductors provided by the transformer circuit 12 and output LC Circuit 18 to generate the required high voltage AC signals, as described in detail below.

Transformer Circuit 12

The transformer circuit 12 is driven by the switching circuit 10 and includes three windings: input winding T1A (35 turns); and output windings T1C (180 turns) and T1D (200 turns) of transformer T1. The transformer T1 is custom made having a bobbin part number 1808-81, and a core of R type, grade u2300 magnetic material.

The transformer T1 is configured to provide fly-back mode voltage conversion and also provides the desired high series inductances necessary to provide a high resonance of the pads 20. Further series inductance is provided in the form of inductors L1 and L2 of the output LC circuit 18 as described below. The resonant circuit including transformer T1 advantageously ballasts the energy applied to the protected metal body 22, and sustains and extends the reactive time when compared with alternative push pull, or forward mode power drivers.

The output winding T1D is in series with the 12V DC main supply line 26. In use, a DC voltage of at least 200V DC is generated across output winding T1D and an AC reactive voltage of typically 200V AC is generated across output winding T1C. Typically, an AC signal having a maximum voltage $V_{MAX}$ of about 412V and a minimum voltage $V_{MIN}$ of about 212V is input at input point 30 to the output LC circuit 18. However, the minimum voltage at input point 30 can be as low as 12V. A diode D10 located between main supply line 26 and input point 30 ensures that DC polarity is always present at each pad 20 and prevents the output voltage on the pads 20 from dropping lower than +12V DC. Diode D10 further provides short circuit pad protection by bypassing FET Q1 and the power transformer T1.

Voltage Feedback Circuit 14

The electrical device 2 includes a voltage feedback circuit 14 for providing a signal relating to the output voltage across the output windings T1C and T1D of the transformer T1 to the control circuit 6. The voltage feedback circuit 14 includes output winding T1B (12 turns) across which an AC voltage corresponding to the foregoing output voltage is provided. The AC voltage is rectified using the half wave rectifier including D9 and C6, and then provided to a voltage divider including R17 and R20. Accordingly, a DC transformer feedback voltage can be provided to analog-to-digital input AN0 of microprocessor IC1.

Current Feedback Circuit 16

The electrical device 2 includes a current feedback circuit 16 for providing a signal relating to the primary core current of the transformer T1 to the control circuit 6. The current feedback circuit 16 includes C30 (47 uF), C7 (4.7 uF), R16 (8.2 R) and R5 (120 R), and the transformer current feedback signal is provided to analog-to-digital input AN1 of microprocessor IC1.

Output LC Circuit 18

The electrical device 2 includes an output LC circuit 18 which is coupled between the transformer circuit 16 and the pads 20. The output LC circuit 18 forms part of the resonant circuit including transformer T1, and includes fast recovery type diodes D1 and D4 in order to reduce capacitive loading, and high frequency roll off of resonant voltages at the pads 20. Each pad 20 is coupled in series with a respective LC resonate sub-circuit. For example, pad 20a is coupled in series with the resonant sub-circuit including L2 and C2.

Pads 20

Each pad 20 includes a conductive plate which is coupled to the output LC circuit 18, and a dielectric layer disposed upon the conductive plate and for being located between the metal body 22 and the conductive plate. The pads 20a, 20b are thereby capacitively coupled to the metal body 22. The metal body 22, pads 20, output LC circuit 18 and transformer circuit 12 collectively form a resonant circuit. Accordingly, a particular electronic device 2 mounted to the chassis of a vehicle will form a unique tuned circuit having a differing resonant Q factor, depending upon a number of variables including the number, type and location of the pads 20 utilized. The control circuit 6 can use the feedback provided by voltage feedback circuit 14 and current feedback 16 to adaptively optimize the signal applied to the pads 20.

Each pad 20 is coupled in series with a respective LC resonate sub-circuit and resonates at its own phase angle, since each pad 20 effectively has an independent (and often unique) electrical characteristic upon application to the metal body 22. The pads 20 also electrically interact with each other whereby, when measuring between pads 20a and 20b in use, the frequency can be twice that of each pad 20 measured alone with reference to ground 28. This phenomenon is due to the phase angle differences present between each independent resonant pad 20.

The foregoing phase difference in voltage between each pad 20 causes charge to flow between pads 20 through the metal body 22. Accordingly, charge flows between each pad pair when, for example, more than three pads 20 are provided and improves the charge coverage by adding additional current paths in the protected metal body 22. An increased charge coverage area, and therefore a wider anti-corrosion area, can be formed by providing increased numbers of spaced apart pads 20. A person skilled in the art will appreciate that further pads 20, and associated LC resonate sub-circuits, can be provided in parallel as desired.

Output Pad Waveforms

In use, the electrical device 2 can be configured to generate an AC voltage signal between each pad 20 and ground 28 as shown in FIG. 3. The AC voltage signal can typically have a maximum voltage $V_{max}$ of about 400V and a minimum voltage $V_{min}$ which is in excess of one quarter of $V_{max}$ (i.e. 100V). The minimum voltage of the AC voltage signal remains relatively high (i.e. and has a DC offset), and advantageously provides a more effective inducement for the flow of a baseline DC charge in the dialectic of the capacitively coupled pads 20.

Figure 3A:
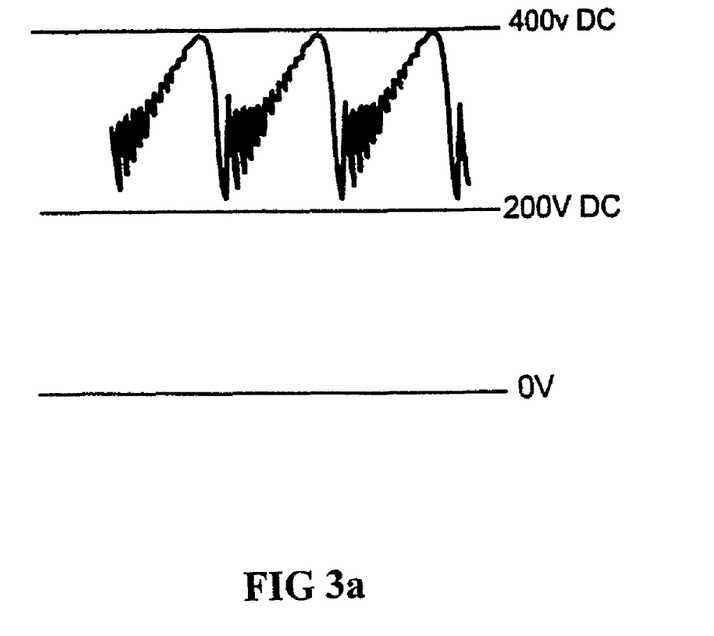
FIG. 3a is a first example of a typical pad voltage measurement.
Figure 3B:
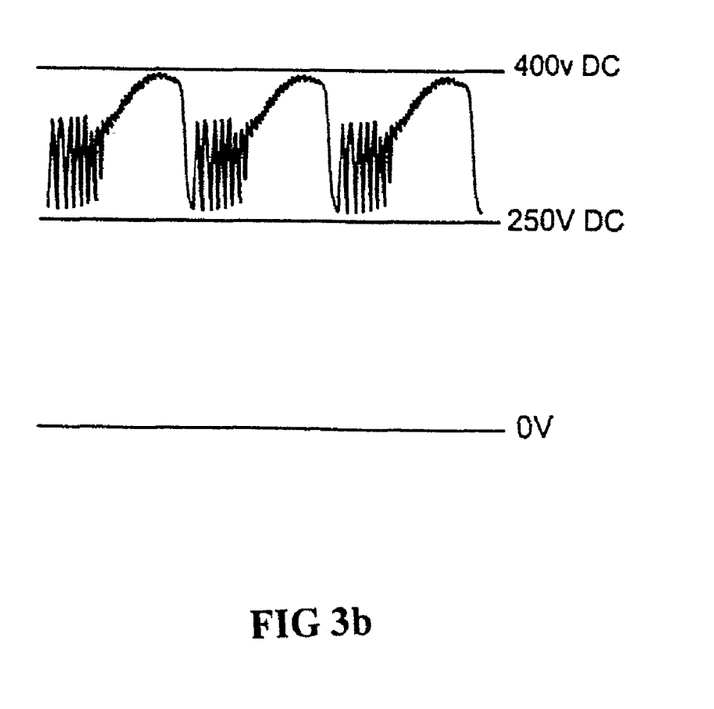

FIG. 3a shows a typical pad voltage measurement for one pad 20a of a pair of pads 20a, 20b. FIG. 3b shows a typical pad voltage measurement for one pad when further pads 20, and associated LC resonate sub-circuits, are connected in parallel. In each case, high frequency oscillations of typically 10 times greater frequency than the 19-20 KHz generating signal at output CCP1 of microprocessor IC1 are present. These high frequency oscillations vary in amplitude and frequency relative to the collective change in pad capacitance when the further pads 20 are applied to the metal body 22 (FIG. 3b). The energy transferred, or the reactive energy within the metal body 22 also increases with increasing pad numbers, since the capacitively coupled pads 20 remain reactive and active for a larger portion of each voltage period.

The DC offset voltage applied to the pads 20 ensures that at least a predetermined level of charge is present in the dielectric of the pads 20 and is not largely diminished in the negative going part of the output waveforms of FIG. 3. The function of the AC component in the waveforms of FIG. 3 is to increase excitation of the charge stored in the dielectric, without diminishing the majority of the charge stored in the dielectric.

Operating Method

The microprocessor IC1 is loaded with a software product to control the operation of the electrical device 2. The software product can be downloaded to the microprocessor IC1 via programming point connector RP1. The operating method 50 of the electrical device 2 performed by the software product is described in detail below with reference to FIG. 4. At step 52, the battery 24 is connected to the electrical device 2 which, in turn, drives the green LED D8 on for 30 seconds using output PG4 of microprocessor IC1. All other pins of microprocessor IC1 are low and FET Q1 is off so as to protect against intermittent power supply conditions and multiple resets. In the event of a short circuited pad 20, fuse F1 will be blown and the method 50 will cease. Data to be used by the software product is loaded from the memory of microprocessor IC1.

Figure 4:
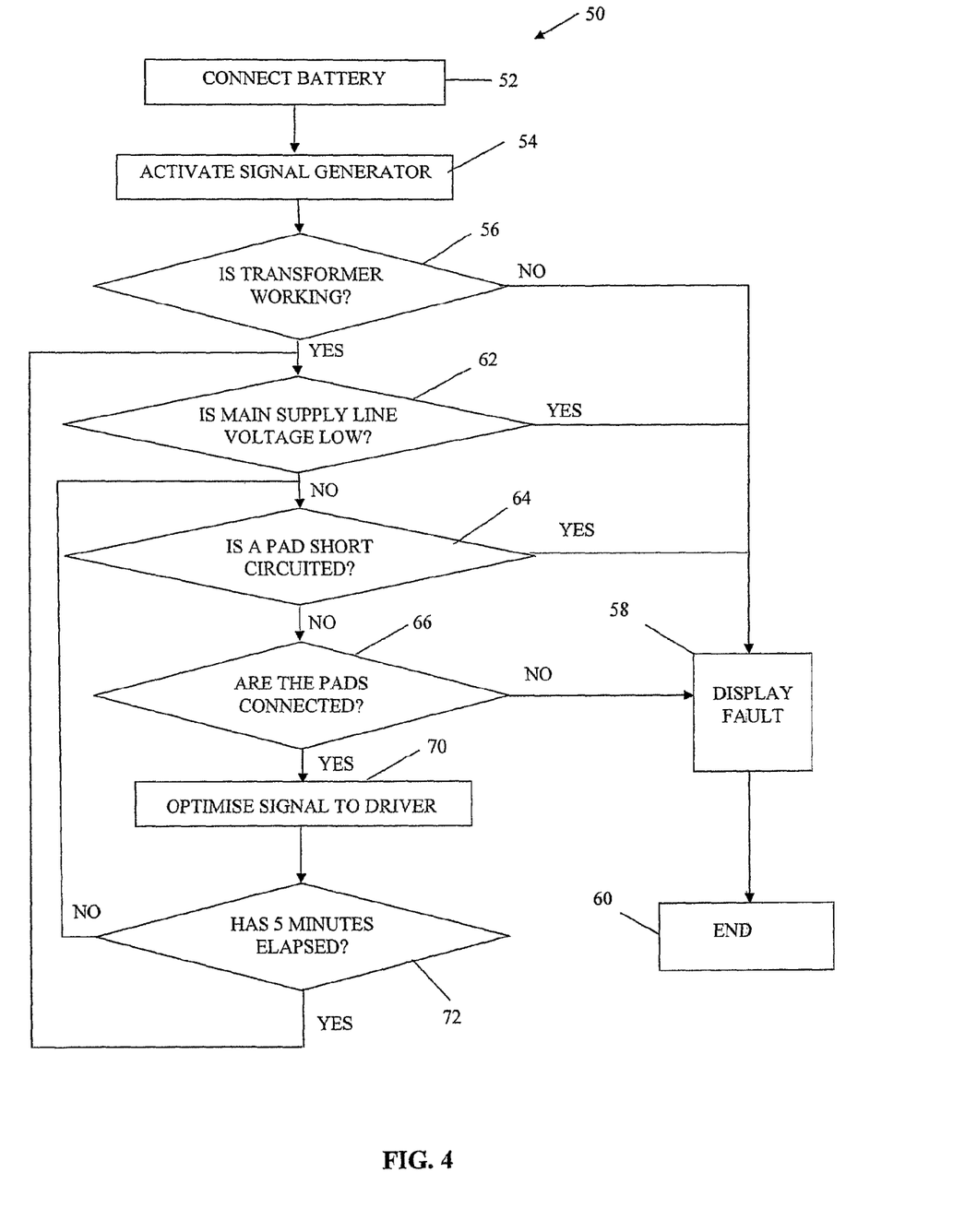
FIG. 4 is a flowchart showing an operating method of the electrical device of FIG. 1 according to an embodiment of the present invention.

At step 54, the signal generator is activated with a soft start (i.e. initially having a low PWM duty cycle (i.e. small time on/time off ratio) which is gradually increased) to produce a driving signal at output CCP1 of microprocessor IC1. An internal comparator associated with input AN1 of microprocessor IC1 is configured to continually monitor for an over-current condition from current feedback circuit 16 using an interrupt routine as described in detail below.

At step 56, the software product determines whether the transformer T1 (and therefore driver circuit 9) is operating successfully using feedback information from voltage feedback circuit 14 via input AN0 of microprocessor IC1.

If at step 56, the transformer T1 is not operating successfully as the voltage feedback is below a predetermined threshold, the method proceeds to step 58 where a driver circuit fault is displayed using display circuit 8 and the signal generator is deactivated (i.e. pin output CCP1 of microprocessor IC1 is set low). In turn, the method ends at step 60.

If at step 56, the transformer T1 is operating successfully at step 56, as the voltage feedback is greater than or equal to a predetermined threshold, the display circuit 8 displays that the transformer T1 is functioning and the green LED D8 is pulsed by microprocessor IC1. The method 50 then proceeds to step 62.

At step 62, the software product measures the voltage of the main supply line 26 using input AN0 of microprocessor IC1. The signal generator at output CCP1 of microprocessor IC1 is momentarily set low during measurement and is therefore not functioning. When performing the measurement of the main supply line 26, the LEDs D2 and D8 are activated so as to provide a small load prior to measurement. D6 is reverse biased and, in turn, D3 becomes forward biased and forms part of the voltage divider including R7 and R20.

If at step 62, the main supply line 26 is below a predetermined lower threshold so as to be indicative of a low battery 24, the display circuit 8 displays a low battery fault at step 58.

If at step 62, the main supply line 26 is greater than a predetermined upper threshold so as to indicate an excessive battery supply voltage, the signal generator is deactivated (i.e. pin output CCP1 of microprocessor IC1 is set low) but no fault is displayed using display circuit 8.

If at step 62, the main supply line 26 is between the predetermined lower and upper thresholds so as to be indicative of a healthy battery 24, the method 50 proceeds to step 64.

At step 64, the software product reads the current signal on AN1 of microprocessor IC1 to determine whether one of the pads 20 is short circuited to ground 28. The feedback current signal input at AN1 of microprocessor IC1 is compared with a stored predetermined current threshold. If the input current signal exceeds the predetermined current threshold because a pad 20 is short circuited or leaks excessive current, a short circuit condition is detected. Input AN1 is configured as an analog-to-digital input for measuring the current feedback, and is also configured as a comparator for implementing the over-current interrupt routine described below.

If at step 64, a short circuit condition is detected, a short circuit condition is displayed using display circuit 8 at step 58. The microprocessor IC1 continually pulses the red LED D2 on and off, whilst green LED D8 remains off.

At step 66, the software product determines whether the pads 20 are coupled to the metal body 22. Input AN0 of microprocessor IC1 measures the transformer voltage from the voltage feedback circuit 14 and input AN1 of microprocessor IC1 measures the transformer current draw from the current feedback circuit 16. If the voltage signal measured at input AN0 is higher than a predetermined voltage threshold and the current signal measured at input AN1 is lower than a predetermined current threshold, then there is no effective load presented by pads 20 and an open circuit fault is detected. When pads 20 are coupled to the metal body 22, the voltage signal measured at input AN0 is less than or equal to the predetermined voltage threshold and the current signal measured at input AN1 is higher than or equal to the predetermined current threshold.

If at step 66, the pads 20 are not coupled to the metal body 22, the software product displays an open circuit pad condition using display circuit 8 at step 58.

If at step 66, the pads 20 are coupled to the metal body 22, the method 50 proceeds to step 70.

At step 70, the PWM output signal at output CCP1 of microprocessor IC1 which drives the driver circuit 9 is optimized using feedback provided by voltage feedback circuit 14 and current feedback circuit 16. This optimisation method is described in detail below.

At step 72, the software product determines whether a period of five minutes has elapsed since step 62 was performed.

In the event that the five minute period has elapsed at step 72, the method 50 proceeds back to step 62.

In the event that the five minute period has not elapsed at step 72, the method 50 proceeds back to step 64 after a small delay (e.g. 4 seconds).

Output Signal Optimisation Method 70

The feedback provided from the driver circuit 9 to the control circuit 6 is used to control the operation of the resonant driver circuit 9, and the resulting output signal to the pads 20, by adjusting the generated PWM signal at output CCP1 of microprocessor IC1. The output signal optimisation method 70 referred to above is now described in detail with reference to FIG. 5.

Figure 5:
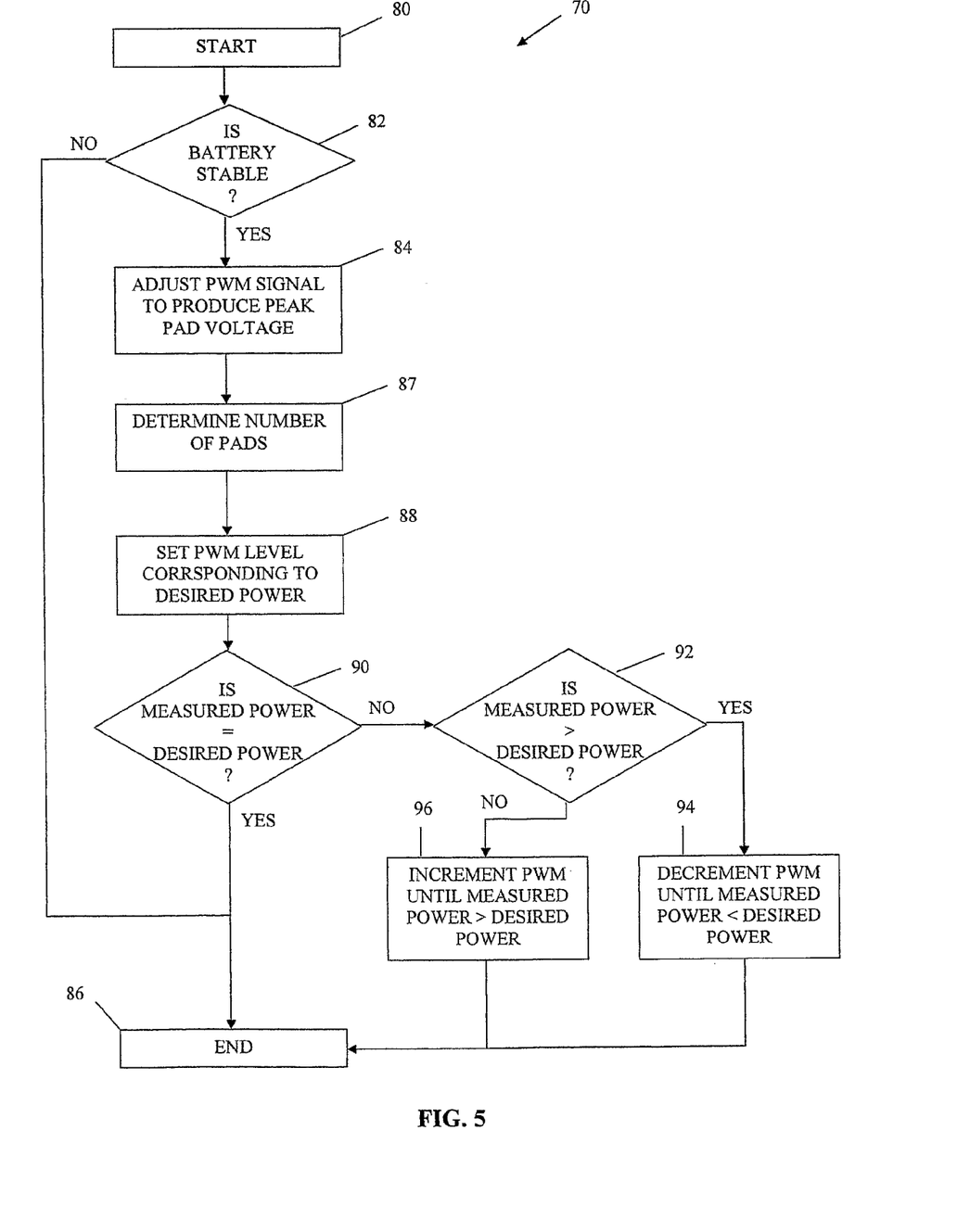
FIG. 5 is a flowchart showing an optimisation method for the signal output of the electrical device of FIG. 1.

At step 80, the optimization method 70 begins.

At step 82, the software product determines whether the mains supply voltage 26 is stable using the mains supply feedback to input AN0 of microprocessor IC1. In this manner, the mains supply voltage is measured a plurality of times and if there is little variance between the measurements, the method 70 proceeds to step 84. If there is significant variance between the measurements, or the measurements are not within acceptable voltage limits indicative of a healthy battery 24, the method 70 ends at step 86 and a fault may be displayed using display circuit 8.

At step 84, the duty cycle of the generated PWM signal is adjusted so as to generate a peak pad output voltage $V_{max}$ (i.e. at the output of driver circuit 9) between 380-400V. The software product verifies that the require voltage $V_{max}$ is reached using voltage feedback from voltage feedback circuit 14, which corresponds to the output voltage of transformer T1.

At step 87, the software product determines the number of pads 20 which are coupled to the metal body 22. Firstly, the maximum power is estimated using the measured transformer core current at input AN1 of microprocessor IC1 received from the current feedback circuit 16 and the voltage of the main supply line 26 which was measured at step 82 (i.e. Power=Voltage×Current). Secondly, the determined power consumption is corresponded to the number of pads 20 coupled to the metal body 22 (i.e. using a stored look up table).

At step 88, the duty cycle of the generated PWM signal at output CCP1 of microprocessor IC1 is adjusted to correspond to a desired (mean) power level for the number of pads determined at step 86 (i.e. using a stored look up table).

At step 90, the software product determines whether the measured power level is equal to the desired power level. As before, the measured power level is estimated using the measured transformer core current signal at input AN1 of microprocessor IC1 received from the current feedback circuit 16 and the voltage of the main supply line 26 which was measured at step 82.

If at step 90, the measured power level is equal to the desired power level, the power output is optimal and the optimization method 70 ends at step 86.

If at step 90, the measured power level is not equal to the desired power level, method 70 proceeds to step 92.

At step 92, the software product determines whether the measured power level exceeds the desired power level.

If at step 92, the measured power level exceeds the desired power level, the duty cycle of the generated PWM signal at output CCP1 of microprocessor IC1 is incrementally decreased until the measured power level no longer exceeds the desired power level at step 94.

If at step 92, the measured power level is lower than the desired power level, the duty cycle of the generated PWM signal at output CCP1 of microprocessor IC1 is incrementally increased until the measured power level exceeds the desired power level at step 96.

Interrupt Routines

The software product can include one or more interrupt routines which can be periodically performed during the method 50 of FIG. 4.

For example, an over-current interrupt routine can be used to periodically monitor input AN1 of microprocessor IC1 for an over-current condition. In the event that current feedback from the current feedback circuit 16 exceeds a predetermined threshold, a fault may be displayed using display circuit 8 and the signal generator may be disabled (i.e. output CCP1 of microprocessor IC1 set low).

In alternative embodiments, many of the diagnostic functions and the optimisation method described above could be implemented using interrupt routines.

According to an embodiment of the present invention, a kit is provided for impeding corrosion of a motor vehicle. The kit would include the electrical device 2 and one or more of the pads 20 for coupling to the motor vehicle. The electrical device 2 may be provided with the software product already downloaded to the microprocessor IC1. Alternatively, the software product may be provided on a disk for downloading to the microprocessor IC1.

A person skilled in the art will appreciate that many embodiments and variations can be made without departing from the ambit of the present invention.

In the foregoing embodiments, feedback from the driver circuit 9 was provided to the control circuit 6 for diagnostic and output optimisation purposes. The feedback was provided by voltage feedback circuit 14 and current feedback circuit 16. In alternative embodiments, other feedback arrangements could be used. For example, feedback could be provided from the output of the driver circuit 9 which relates directly to the signals applied to one or more of the pads 20.

A person skilled in the art will appreciate that many of the circuits shown in the foregoing embodiments can be modified and replaced with alternative circuits without departing from the scope and the spirit of the present invention.

In compliance with the statute, the invention has been described in language more or less specific to structural or methodical features. It is to be understood that the invention is not limited to specific features shown or described since the means herein described comprises preferred forms of putting the invention into effect.

The claims defining the invention are as follows:

1. An electrical device for impeding corrosion of a metal body, the electrical device including:
   a driver circuit including a switching circuit coupled to an inductive circuit and for driving one or more pads coupled to the metal body so that corrosion of the metal body is impeded;
   a control circuit coupled to the switching circuit and for controlling the operation of the driver circuit; and
   a feedback circuit for providing feedback from the driver circuit to the control circuit.

2. An electrical device as claimed in claim 1, wherein the inductive circuit includes a transformer.

3. An electrical device as claimed in claim 1, wherein the inductive circuit includes at least one inductor.

4. An electrical device as claimed in claim 1, wherein the inductive circuit includes a transformer, and one or more inductors.

5. An electrical device as claimed in claim 1, wherein the driver circuit includes:
   an LC circuit for coupling to the pads and forming part of said inductive circuit;
   a transformer circuit for driving the LC circuit and forming another part of said inductive circuit; and
   the switching circuit for driving the transformer circuit.

6. An electrical device as claimed in claim 1, wherein the control circuit includes a microcontroller, microprocessor or other like computational device.

7. An electrical device as claimed in claim 6 wherein, in use, the control circuit performs diagnostics of the electrical device using feedback from the feedback circuit.

8. An electrical device as claimed in claim 1, wherein the control circuit includes a signal generator for driving the switching circuit.

9. An electrical device as claimed in claim 1, wherein the driver circuit includes a transformer, and the feedback circuit includes a voltage feedback circuit for providing a signal relating to the voltage of the transformer to the control circuit.

10. An electrical device as claimed in claim 1, wherein the driver circuit includes a transformer, and the feedback circuit includes a current feedback circuit for providing a signal relating to the core current of the transformer to the control circuit.

11. An electrical device as claimed in claim 1, wherein the electrical device further includes a display circuit for displaying information relating to the operation of the electrical device.

12. An electrical device as claimed in claim 1 wherein, in use, the electrical device is configured to generate an AC voltage signal between each pad and ground so that corrosion of the metal body is impeded.

13. An electrical device as claimed in claim 12, wherein the AC voltage signal may have a maximum voltage $V_{max}$ and a minimum voltage $V_{min}$ which is in excess of one quarter of $V_{max}$.

14. A method for impeding corrosion of a metal body using an electrical device, the method including the steps of:
   driving one or more pads coupled to the metal body with a driver circuit including a switching circuit coupled to an inductive circuit so that corrosion of the metal body is impeded;
   providing feedback from the driver circuit to a control circuit; and
   controlling, with the control circuit, the operation of the driver circuit using the provided feedback.

15. A method as claimed in claim 14, wherein the step of driving involves driving each pad with an AC voltage signal between the pad and ground.

16. A method as claimed in claim 14, wherein the step of providing includes providing feedback in the form of any one or more of the following group: a signal relating to the output voltage of a transformer of the driver circuit, and a signal relating to the core current of the transformer.

17. A method as claimed in claim 14, further including the step of diagnosing a fault condition of the electrical device.

18. A method as claimed in claim 14, wherein said method is performed by one or more processors loaded with computer readable instructions.

19. A method as claimed in claim 14, wherein said method is performed by a storage media containing computer readable instructions for execution by one or more processors.

20. A method for impeding corrosion of a metal body using an electrical device, the method including the steps of:
   driving one or more pads coupled to the metal body with a driver circuit including a switching circuit coupled to an inductive circuit so that corrosion of the metal body is impeded;
   providing feedback from the driver circuit to a control circuit; and
   determining, with the control circuit, characteristics relating to the operation of the driver circuit using the provided feedback.

21. A method as claimed in claim 20, further including the step of optimising an output signal of the driver circuit using the determined characteristics.

22. A method as claimed in claim 21, wherein the power of the output signal is optimised in accordance with the number of pads coupled to the metal body.

* * * * *